United States Patent [19]

Bridges et al.

[11] Patent Number: 4,770,250

[45] Date of Patent: Sep. 13, 1988

[54] HYDRAULICALLY ACTUATED LOCK PIN FOR WELL PIPE HANGER

[75] Inventors: Charles D. Bridges; Robert K. Law, both of Houston, Tex.

[73] Assignee: Vetco Gray Inc., Houston, Tex.

[21] Appl. No.: 48,105

[22] Filed: May 7, 1987

[51] Int. Cl.$^4$ .................... E21B 23/00; F16L 35/00
[52] U.S. Cl. ..................... 166/382; 166/85; 285/18; 285/39; 285/133.2; 285/140
[58] Field of Search ............... 166/75.1, 82, 83, 85, 166/88, 96, 379–383; 285/18, 39, 133.2, 140–142, 404

[56] References Cited

U.S. PATENT DOCUMENTS

| | | | |
|---|---|---|---|
| 3,137,348 | 6/1964 | Ahlstone et al. | 166/88 |
| 3,155,401 | 11/1964 | Musolf | 285/18 |
| 3,248,132 | 4/1966 | Pierce, Jr. | 285/133 |
| 3,336,976 | 8/1967 | Word, Jr. | 166/85 |
| 3,338,596 | 8/1967 | Knox | 285/18 |
| 3,821,984 | 7/1974 | Lee | 166/85 |
| 4,214,778 | 7/1980 | Diehl | 285/39 |
| 4,307,783 | 12/1981 | Lanmon, III | 166/82 |
| 4,650,226 | 3/1987 | Babbitt et al. | 285/141 |
| 4,653,778 | 3/1987 | Alandy | 285/39 |

FOREIGN PATENT DOCUMENTS 1494301 12/1977 United Kingdom .

Primary Examiner—Jerome W. Massie, IV
Assistant Examiner—Bruce M. Kisliuk
Attorney, Agent, or Firm—James E. Bradley

[57] ABSTRACT

A lock pin for locking a pipe hanger assembly in a wellhead is hydraulically actuated. The lock pin extends through a radial passage provided in the wellhead. The lock pin moves linearly to an inner position to engage the hanger assembly. A hydraulic piston is coupled to the exterior of the wellhead for providing an inward force to the lock pin. A retainer is mounted to the wellhead by threads. While the lock pin is held in the inner position under hydraulic pressure, the retainer is rotated inward against a shoulder provided on the lock pin to hold the lock pin in the inner engaged position. The hydraulic pressure can then be removed.

10 Claims, 2 Drawing Sheets

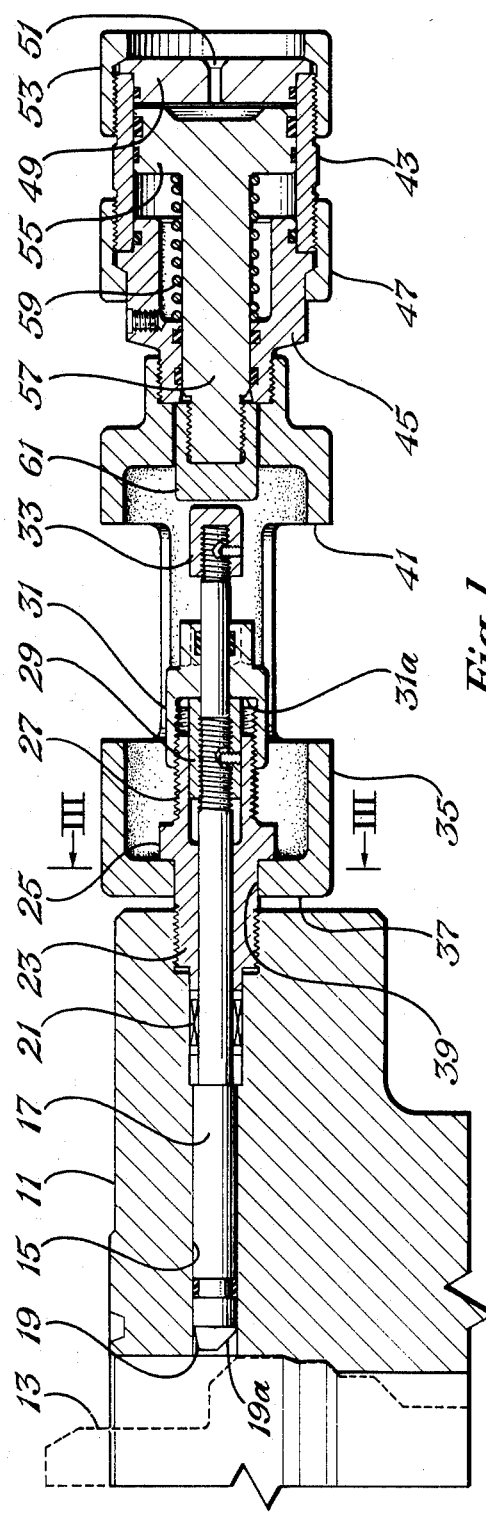
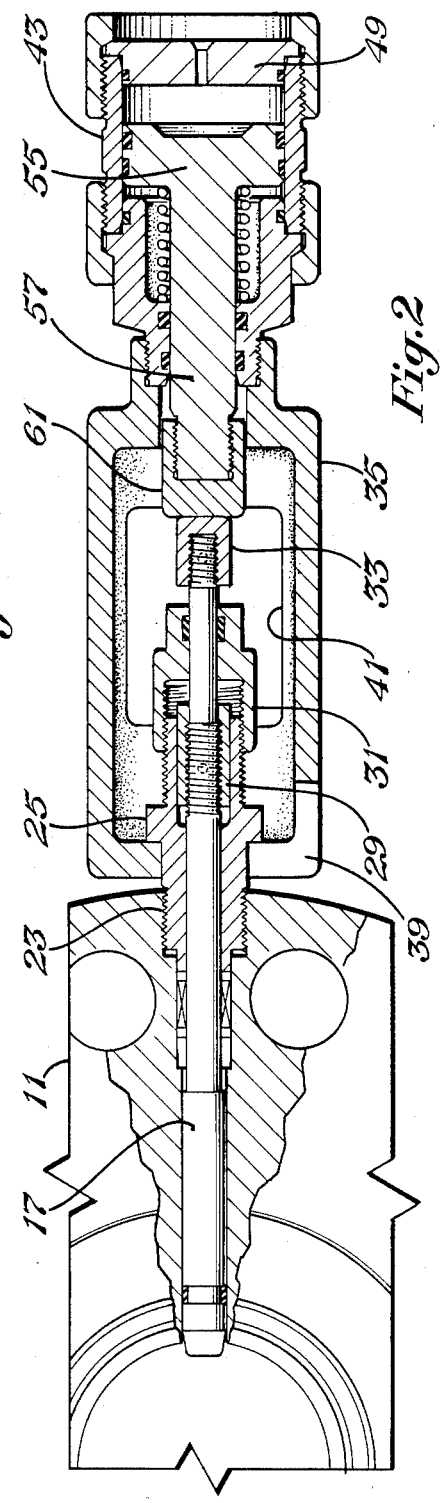
Fig.1
Fig.2

HYDRAULICALLY ACTUATED LOCK PIN FOR WELL PIPE HANGER

BACKGROUND OF THE INVENTION

1. Field of the Invention:

This invention relates in general to lock pins for locking tubing hangers inside a wellhead of an oil or gas well, and in particular to a hydraulically actuated lock pin mechanism.

2. Description of the Prior Art:

A conventional means for securing a tubing hanger in a wellhead is by the use of a number of lock screws. The lock screws extend through radial passages in the wellhead, which are threaded. Each lock screw has a conical nose that engages a shoulder of the pipe hanger. Rotating the lock screw causes the nose to bear against the hanger, wedging it tightly in the wellhead against upward force.

The amount of downward force against the pipe hanger obtainable by conventional lock screws is limited. A considerable portion of the thrust load is lost due to friction between the rotating nose of the lock screw and the shoulder of the pipe hanger. As the screw is rotated against the hanger, a flat develops on the nose of the screw due to excessive bearing stress. A depression may also develop on the hanger. This increases the loss of load to friction as the nose begins to flatten. Greater torque results in further deformation of the nose, and eventually the nose of the screw will cease to rotate at all. This can result in torsional shear failure of the screw.

Traditionally, a sufficient number of lock screws were required to generate a total force capable of restraining a tubing hanger against the load from below. The load from below was previously based on the seal area of the tubing bowl less the area of the tubing string times the working pressure of the well. Recently, standards have been increased to require the tubing hanger to be locked down sufficiently to restrain a tubing hanger subjected to a full blind load of the rated working pressure of the tubing head top connection. In many cases, it is nearly impossible to install conventional lock screws of sufficient size, number and strength to meet this requirement. Too many locking screws will be detrimental to the working stress levels of the flange connector portion of the wellhead.

SUMMARY OF THE INVENTION

The lock pin of this invention is not rotated to lock the hanger down. The lock pin moves linearly from an outer position into an inner position, in which its nose engages the hanger. A hydraulic piston is coupled to the wellhead for applying an inward force to the lock pin to move it to the inner position. Once in the inner position, with hydraulic force still maintained on the lock pin, a retainer is rotated into a position to lock the lock pin in the inner position. The hydraulic piston assembly can then be removed from the wellhead.

BRIEF DESCRIPTION OF THE DRAWINGS

FIG. 1 is a vertical sectional view of a lock pin mechanism and hydraulic piston assembly constructed in accordance with this invention and showing the lock pin in an outer position.

FIG. 2 is a sectional view of the lock pin mechanism and hydraulic piston assembly of FIG. 1, taken in a plane 90 degrees from that shown in FIG. 1, and showing the lock pin in an inner position.

DESCRIPTION OF THE PREFERRED EMBODIMENT

Figure 3:
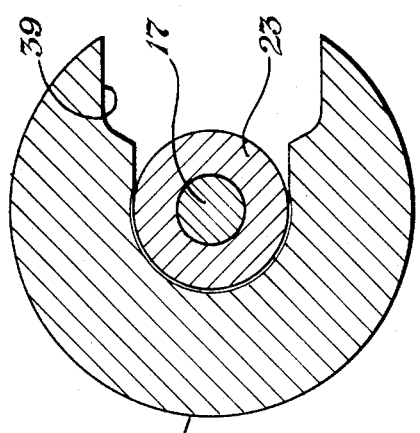
FIG. 3 is a sectional view of a portion of the lock pin mechanism of FIG. 1, taken along the line III—III of FIG. 1.

Referring to FIG. 1, a part of a wellhead 11 is shown. The portion shown is commonly called a tubing head, but will be referred to herein as a wellhead. Wellhead 11 is located at the top of a well, and supports within it one or more casing hangers (not shown) and a tubing hanger 13. The casing hanger is supported within a part of the wellhead 11 called a casing head which is located below the tubing head shown. The tubing hanger 13 is supported in the bore of the wellhead 11 in an area known as the tubing bowl. A string of tubing (not shown) will be suspended by the tubing hanger 13. A plurality of radial passages 15 (only one shown) extend through the wellhead 11. The radial passages 15 are evenly spaced around the circumference of the wellhead 11.

A lock pin 17 is carried in each radial passage 15. The lock pin 17 has a nose 19 on its inner end. As shown in FIG. 1, the lower side 19a of the nose is flattened. Also, the side edges of the nose 19 are tapered, as shown in FIG. 2. The lock pin 17 will move between an outer position, shown in FIG. 1, and an inner position shown in FIG. 2. In the inner position, the nose 19 bears against a shoulder on the tubing hanger 13 and applies a downward force on the tubing hanger 13.

A compressible packing 21 is located in the wellhead passage 15 surrounding the lock pin 17. A packing gland 23 is secured by threads to the outer end of passage 15. The packing gland 23 has an inner end that bears against the packing 21 to compress the packing 21 and cause sealing when the packing gland 23 is rotated inward. Packing gland 23 has a flange 25 that is located exterior of the wellhead 11. Packing gland 23 also has a set of exterior threads 27 that are located outward from the flange 25. The lock pin 17 extends completely through a passage provided in the packing gland 23.

A shoulder nut 29 is rigidly secured to the lock pin 17 at a point between its ends. Shoulder nut 29 is secured by a set screw, as shown, to threads contained on the lock pin 17. The shoulder nut 29 provides an outward facing shoulder on the lock pin 17.

A retainer 31 is secured to the threads 27 of the packing gland 23. Retainer 31 has a passage through it through which the lock pin 17 slidingly extends. Retainer 31 is cup-shaped, with an open inner end and a closed outer end, except for the passage for the lock pin 17. The cavity of the retainer 31 has an inward facing shoulder 31a that is adapted to contact and bear against the shoulder nut 29. The retainer 31, being connected to the packing gland 23, does not move with the lock pin 17. The retainer 31 has wrench flats formed on its outer end to enable tightening of the retainer with a wrench. An end cap 33 is secured to the outer end of the lock pin 17.

A cage 35, which is part of a hydraulic actuator assembly, is adapted to be releasably coupled to the packing gland 23 in the embodiments of FIGS. 1-4. Cage 35 is a hollow tubular member having an inner end 37. The inner end 37 has a slot 39, as shown in FIG. 3, that fits closely around the packing gland 23 between the wellhead 11 and the packing gland flange 25. The packing gland 23 serves as a support member to support the cage 35 on the wellhead. Referring again to FIG. 1, the cage 35 has two large apertures 41 formed in its sidewall. The apertures 41 provide access to the retainer 31 to enable it to be rotated by an operator while the cage 35 is supported on the packing gland 23.

A hydraulic cylinder 43 is carried at the outer end of the cage 35. The hydraulic cylinder 43 includes an inner end 45 that is secured to the outer end of the cage 35. A collar 47 connects the cylinder 43 with the cylinder inner end 45. A cylinder head 49 is located at the outer end of the cylinder 43. Cylinder head 49 has a port 51 for connecting to a source of hydraulic fluid pressure. Cylinder head 49 is connected to the cylinder 43 by a collar 53.

A piston 55 is reciprocally carried in the cylinder 43. Piston 55 has a piston shaft 57 that extends inwardly and sealingly passes through the cylinder inner end 45. A spring 59 is biased between the cylinder inner end 45 and the piston 55, to urge the piston 55 outward. A cap 61 is secured to the inner end of the piston shaft 57.

In operation, the cage 35 is placed on the packing gland 23 by way of the slot 39. Hydraulic fluid pressure is supplied through port 51 to push the piston 55 inward. Piston shaft 57 will contact the end cap 33 of the lock pin 17 and push the lock pin 17 inward. The reactive force against the inward movement of piston 55 is transmitted through the inner end of cage 35 to the packing gland flange 25. The nose 19 will contact the shoulder of the tubing hanger 13 and wedge tightly to provide a lock down force.

Figure 4:
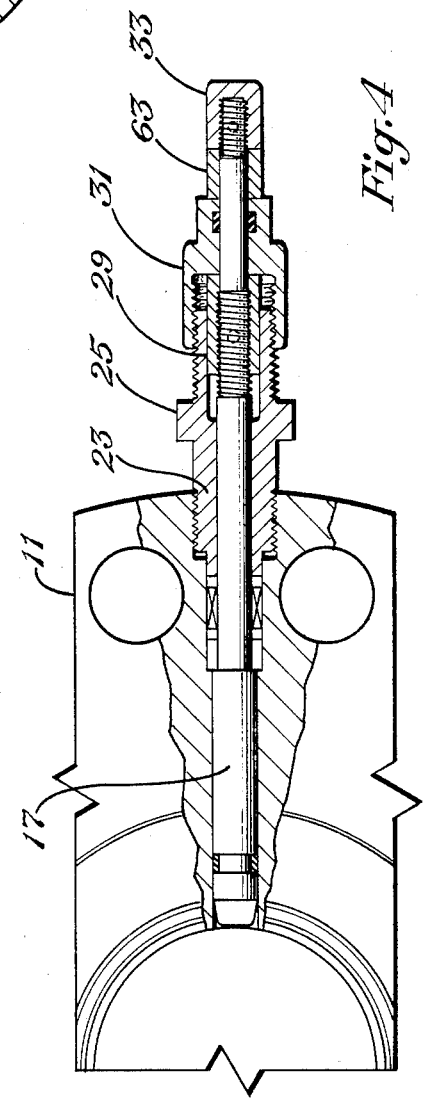
FIG. 4 is a sectional view of the lock pin mechanism shown in FIG. 2, and showing the lock pin being mechanically retracted to an outer position.

While maintaining the hydraulic pressure on the piston 55, the operator then rotates the retainer 31 to screw it inward on the threads 27. FIG. 2 shows the lock pin 17 in the inner position, and the retainer 31 ready to be rotated inward. When the retainer 31 is rotated to its inner locking position, its inner shoulder 31a will contact the shoulder nut 29. This contact prevents the lock pin 17 from moving outward. The hydraulic pressure may then be relieved. The cage 35 along with the entire hydraulic actuating assembly may then be removed from the lock pin 17 as shown in FIG. 4.

The lock pin 17 can be withdrawn from the engagement with the tubing hanger 13 without the need of any hydraulic actuator. As shown in FIG. 4, this is handled by placing a spacer ring 63 between the end cap 33 and the retainer 31. The spacer ring 63 serves as a bearing surface to transmit an outward force from the retainer 31 to the lock pin 17 when retainer 31 is rotated in a reverse direction. The spacer 63 transmits the force to the end cap 33, drawing the lock pin 17 outward as the retainer 31 screws outward on the packing gland 23.

Figure 5:
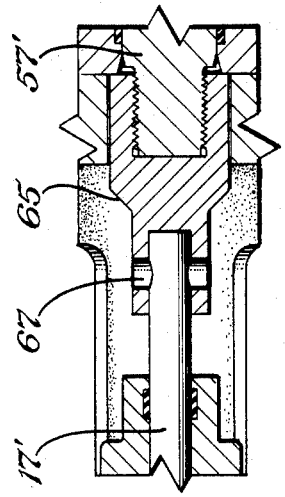
FIG. 5 is a view of a portion of an alternate embodiment of a lock pin mechanism.

For some installations, it may be desirable to keep the hydraulic actuating assembly mounted to each lock pin 17. In FIG. 5, the common elements to those in the first embodiment are shown with a prime symbol. In the event that the hydraulic actuating assembly remains with each lock pin 17', a coupling 65 is secured to the inner end of the piston shaft 57', rather than the end cap 61 shown in FIG. 1. The coupling 65 is secured by a pin 67 to the outer end of the lock pin 17'. Hydraulic fluid pressure on the outer side of the piston will push the lock pin 17' inward in the same manner as discussed in connection with the first embodiment. Hydraulic fluid pressure applied to the inner side of the piston causes the piston shaft 57' to move outward. It will draw along with it the lock pin 17'.

The invention has significant advantages. The hydraulic lock pin employs no threads for actuation, eliminating the portion of the thrust load loss that is due to friction in the threads of conventional lock screws. Since there are no threads needed for moving the lock pin inward, there is no need to use torque wrenches at the well site to apply high torque, a potentially dangerous task. Fewer lock pins will be required than using conventional lock screws, because of more efficiency in obtaining a downward load. The flattened nose reduces the portion of the thrust load previously lost due to friction and bearing stress in conventional conical nose surface lock screws.

While the invention has been shown in only two of its forms, it should be apparent to those skilled in the art that it is not so limited, but is susceptible to various changes without departing from the scope of the invention.

I claim:

1. In a wellhead having a bore containing a pipe hanger assembly, an improved means for securing the hanger assembly, comprising in combination:
   a lock pin extending through a passage provided in the wellhead, the lock pin having an inner end and being moveable to an inner position in which the inner end protrudes into the bore and engages the hanger assembly;
   a piston and cylinder adapted to be coupled to the wellhead in alignment with the lock pin;
   means for applying fluid pressure to the cylinder to move the piston nonrotatably and linearly inward for applying an inward force to the lock pin to move the lock pin without rotation to the inner position; and
   retainer means mounted to the wellhead, operable after the piston has moved the lock pin to the inner position, for securing the lock pin in the inner position while the lock pin is held in the inner position by the piston, for enabling the fluid pressure to be removed.

2. In a wellhead having a bore containing a pipe hanger assembly, an improved means for securing the hanger assembly, comprising in combination:
   a lock pin extending through a passage provided in the wellhead, the lock pin having an inner end and being moveable to an inner position in which the inner end protrudes into the bore and engages the hanger assembly;
   a support member secured to the wellhead, having a passage through which the lock pin extends and a set of threads located exterior of the wellhead;
   piston means adapted to be coupled to the wellhead, for applying an inward force to the lock pin to move the lock pin relative to the support member to the inner position when supplied with pressure;
   an outward facing shoulder on the lock pin located outward of the support member; and
   a retainer having a set of threads which engage the threads of the support member, the retainer being moveable between an outer released position to an inner locking position by relative rotation between the support member and retainer, the retainer having an inward facing shoulder adapted to engage the shoulder on the lock pin when the retainer is in the locking position and the lock pin is in the inner position, to hold the lock pin in the inner position and allow the pressure to be removed.

3. In a wellhead having a bore containing a pipe hanger assembly, an improved means for securing the hanger assembly, comprising in combination:

a lock pin extending through a passage provided in the wellhead, the lock pin having an inner end and being moveable to an inner position in which the inner end protrudes into the bore and engages the hanger assembly;

piston means adapted to be coupled to the wellhead, for applying an inward force to the lock pin to move it to the inner position when supplied with pressure;

a packing located in the wellhead passage and surrounding the lock pin;

a packing support member secured by threads to the wellhead passage, having an inner end that engages and applies compression to the packing to cause sealing around the lock pin, the packing support member having threads on its outer end;

an outward facing shoulder on the lock pin located outward of the support member; and a retainer secured to the threads of the support member, the retainer being moveable between an outer released position and an inner locking position by rotating the retainer relative to the support member, the retainer having an inward facing shoulder adapted to engage the shoulder on the lock pin when the retainer is rotated to the locking position while the lock pin is held in the inner position by the piston means, to hold the lock pin in an inner position after the pressure is removed.

4. In a wellhead having a bore containing a pipe hanger assembly, an improved means for securing the hanger assembly, comprising in combination:

a lock pin extending through a passage provided in the wellhead, the lock pin having an inner end and being moveable to an inner position in which the inner end protrudes into the bore and engages the hanger assembly;

a support member secured to the wellhead, having a passage through which the lock pin extends and a set of threads exterior of the wellhead;

an outward facing shoulder on the lock pin located outward of the support member;

a case adapted to be coupled to the exterior of the wellhead, around an outer portion of the lock pin;

a cylinder mounted to an outer end of the case and adapted to axially align with the lock pin;

a piston reciprocally carried in the cylinder for moving the lock pin relative to the support member to the inner position when the cylinder is supplied with fluid pressure;

a retainer secured to the threads of the support member, having a passage through which the lock pin extends, the retainer having an inward facing shoulder adapted to engage the shoulder of the lock pin, the retainer being rotatable on the support member to move inward to a locking position with the retainer shoulder bearing against the lock pin shoulder when the lock pin is in the inner position, to hold the lock pin in the inner position after the pressure is removed; and the case having an aperture for providing access to rotate the retainer while the case is mounted to the wellhead.

5. In a wellhead having a bore containing a pipe hanger assembly, an improved means for securing the hanger assembly, comprising in combination:

a lock pin extending through a radial passage provided in the wellhead, the lock pin having an inner end and an outer end and being moveable between an inner position in which the inner end protrudes into the bore and engages the hanger assembly, and an outer position in which the inner end withdraws from the bore;

a support member secured to the wellhead, having a passage through which the lock pin extends and a set of threads exterior of the wellhead;

an outward facing shoulder on the lock pin located outward of the support member;

a hydraulic case;

mounting means for mounting the hydraulic case to the wellhead around the outer end of the lock pin;

a hydraulic cylinder mounted to an outer end of the case;

a piston carried in the cylinder along the axis of the lock pin, the piston having a shaft adapted to contact the outer end of the lock pin to push the lock pin inward when the cylinder is supplied with hydraulic fluid pressure;

a retainer secured to the threads of the support member and having a passage through which the lock pin extends, the retainer having an inward facing shoulder adapted to engage the shoulder of the lock pin when the lock pin is held in the inner position with the piston, by rotating the retainer relative to the support member, to hold the lock pin in the inner position after pressure is removed;

the case having an aperture for providing access to rotate the retainer; and the mounting means allowing the case, cylinder, and piston to be removed as a unit from the wellhead, with the retainer holding the lock pin in the inner position.

6. In a wellhead having a bore containing a pipe hanger assembly, an improved means for securing the hanger assembly, comprising in combination:

a lock pin extending through a radial passage provided in the wellhead, the lock pin having an inner end and an outer end and being moveable between an inner position in which the inner end protrudes into the bore and engages the hanger assembly, and an outer position in which the inner end withdraws from the bore;

a support member secured to the wellhead, having a passage through which the lock pin extends and a set of threads exterior of the wellhead, the support member having an external flange located exterior of the wellhead;

an outward facing shoulder on the lock pin located outward of the support member;

a case, having an outer end and an inner end containing slot means for releaseably placing the case on the support member with the inner end located between the flange and the wellhead;

a cylinder mounted to the outer end of the case and adapted to axially align with the lock pin;

a piston carried in the cylinder, the piston having a shaft for contacting the outer end of the lock pin for moving the lock pin to the inner position when the cylinder is supplied with fluid pressure; and a retainer having a set of threads which engage the threads of the support member to enable the retainer to be moved between an outer released position to an innner locking position by rotating the retainer relative to the support member, the retainer having an inward facing shoulder adapted to engage the shoulder on the lock pin when the retainer is rotated to the locking position while the lock pin is held in the inner position by the piston means, to hold the lock pin in the inner position after pressure is removed;

the slot means allowing the case, cylinder and piston to be removed as a unit, with the retainer holding the lock pin the inner position.

7. In a wellhead having a bore containing a pipe hanger assembly, an improved means for securing the hanger assembly, comprising in combination:

a lock pin extending through a radial passage provided in the wellhead, the lock pin having an inner end and an outer end and being moveable between an inner position in which the inner end protrudes into the bore and engages the hanger assembly, and an outer positon in which the inner end withdraws from the bore a support member secured to the wellhead, having a passage through which the lock pin extends and a set of threads exterior of the wellhead, the support member having an external flange located exterior of the wellhead;

an outward facing shoulder on the lock pin located outward of the support member;

a case, having an outer end and an inner end containing slot means for releaseably placing the case on the support member with the inner end located between the flange and the wellhead;

a hydraulic cylinder mounted to the outer end of the case for axial alignment with the lock pin when the case is mounted on the support member;

a piston carried in the cylinder along the axis of the lock pin, and having a shaft adapted to contact the outer end of the lock pin for moving the lock pin to the inner position when the cylinder is supplied with hydraulic fluid pressure;

a retainer having a set of threads which engage the threads of the support member to enable the retainer to be moved between an outer released postion to an inner locking position by rotating the retainer relative to the support member, the retainer having an inward facing shoulder adapted to engage the shoulder on the lock pin when the retainer is rotated to the locking position while the lock pin is held in the inner position by the piston means, to hold the lock pin in the inner position after pressure is removed;

the case having an aperture for providing access to rotate the retainer while the case, cylinder and piston are mounted to the support member; and a bearing surface adapted to be carried on the outer end of the lock pin outward of the retainer and facing inward, for contact by the retainer when the retainer is unscrewed from the support member, to cause the lock pin to move from the inner position to the outer position.

8. A method of securing a pipe hanger assembly inside the bore of a wellhead, comprising:

placing a lock pin in a passage provided in the wellhead;

mounting a piston and cylinder to the wellhead;

applying fluid pressure to the cylinder for moving the piston inward without rotation to move the lock pin linearly inward to an inner position to engage the hanger assembly; and while maintaining fluid pressure in the cylinder, securing the lock pin in the inner position with a retainer located on the exterior of the wellhead; then removing the fluid pressure and retaining the lock pin in the inner position with the retainer.

9. A method of securing a pipe hanger assembly inside the bore of a wellhead, comprising:

placing a lock pin in a passage provided in a wellhead;

mounting a piston to the wellhead;

mounting a retainer around the lock pin to threads provided on the exterior of the wellhead;

providing mating shoulders on the retainer and the lock pin;

applying pressure to the piston to move the lock pin inward to an inner position relative to the retainer to engage the hanger assembly; and while maintaining pressure on the piston, rotating the retainer on the threads to advance the retainer inward to cause the retainer shoulder to bear against the lock pin shoulder to hold the lock pin in the inner position; then removing the pressure.

10. A method of securing and releasing a pipe hanger assembly inside the bore of a wellhead, comprising:

placing a lock pin having an inner end and an outer end in a radial passage provided in the wellhead;

releasably mounting a piston to the exterior of the wellhead in axial alignment with the outer end of the lock pin;

mounting a retainer around the lock pin to threads carried on the exterior of the wellhead;

providing the retainer and the lock pin with mating shoulders;

applying pressure to cause the piston to bear against the outer end of the lock pin and push the lock pin while the retainer is stationary to an inner position with the inner end of the lock pin engaging the pipe hanger assembly;

while maintaining the pressure, rotating the retainer on the threads in a first direction to advance the retainer inward to cause the retainer shoulder to bear against the lock pin shoulder, to hold the lock pin in the inner position; then releasing the pressure and removing the piston from the wellhead; then, to release the hanger assembly;

providing a bearing surface on the lock pin outward from the retainer; and rotating the retainer in a second direction to unscrew the retainer from the threads carried on the wellhead and to cause the retainer to contact the bearing surface and push outward on the lock pin to move it the inner position.

* * * * *